(12) United States Patent
Plüss (10) Patent No.: US 8,490,268 B2
(45) Date of Patent: Jul. 23, 2013

(54) METHOD FOR LASER CUTTING OF UNFINISHED METAL SHEETS AND LASER CUTTING MACHINE FOR CARRYING OUT THE METHOD

(75) Inventor: Thomas Plüss, Wynau Be (CH)

(73) Assignee: Bystronic Laser AG, Niederönz (CH)

( * ) Notice: Subject to any disclaimer, the term of this patent is extended or adjusted under 35 U.S.C. 154(b) by 1334 days.

(21) Appl. No.: 11/795,986

(22) PCT Filed: Dec. 30, 2005

(86) PCT No.: PCT/CH2005/000778
§ 371 (c)(1), (2), (4) Date: Aug. 27, 2007

(87) PCT Pub. No.: WO2006/079230
PCT Pub. Date: Aug. 3, 2006

(65) Prior Publication Data
US 2008/0087651 A1    Apr. 17, 2008

(30) Foreign Application Priority Data
Jan. 25, 2005 (EP) .................................... 05405035

(51) Int. Cl.
*B23Q 7/14* (2006.01)
*B23K 26/38* (2006.01)

(52) U.S. Cl.
USPC .. 29/412; 29/403.1; 219/121.67; 219/121.72; 414/677; 414/592; 414/806; 414/222.01; 414/787; 83/50; 83/78

(58) Field of Classification Search
USPC ............... 219/121.67–121.72, 121.82; 83/23, 83/157, 50, 55, 78; 414/222.07, 592, 677, 414/787, 806; 72/426
See application file for complete search history.

(56) References Cited

U.S. PATENT DOCUMENTS 3,570,561 A * 3/1971 Frodermann et al. ........... 83/157
4,012,033 A * 3/1977 Parrish, II ..................... 271/302

(Continued)

FOREIGN PATENT DOCUMENTS

DE    37 12 682 A1   11/1988
DE    38 26 530 A1   5/1990

(Continued)

OTHER PUBLICATIONS

International Search Report.

*Primary Examiner* — Samuel M Heinrich
(74) *Attorney, Agent, or Firm* — Collard & Roe, P.C.

(57) ABSTRACT

The invention relates to a method for laser-cutting sheet steel (1), wherein a sheet steel (1) is gradually inserted in a defined position into the cutting area (2) of a laser cutter in a direction of advance V in order to machine it. The sheet steel (1) is machined by laser cutting in a machinable area corresponding to the length of the cutting area (2), in the entire machinable area or only in a section thereof. The machined part (8) and the non-machined part (8) of the sheet steel may also only overlap in some sections (10). An automatic discharge device is also provided. The manufactured parts and the remaining grid are likewise cut from the sheet steel (1) by laser cutting. The method can be repeated in several machining steps until the sheet steel (1) is completely machined, the results of the preceding machining step being taken into consideration for the subsequent machining step. The invention allows to optimally utilize the sheet steel (1) even when using smaller laser cutters.

7 Claims, 4 Drawing Sheets

U.S. PATENT DOCUMENTS

| | | | |
|---|---|---|---|
| 4,201,905 A * | 5/1980 | Clark et al. ................. 219/121.6 |
| 4,335,296 A * | 6/1982 | Bredow .................... 219/121.67 |
| 4,553,016 A * | 11/1985 | Kunii et al. ............... 219/121.67 |
| 4,782,208 A | 11/1988 | Withrow et al. |
| 4,796,341 A * | 1/1989 | Kuhn, II .......................... 29/33 P |
| 5,185,510 A * | 2/1993 | Zumstein ................. 219/121.67 |
| 5,229,571 A * | 7/1993 | Neiheisel ................. 219/121.63 |
| 5,373,136 A * | 12/1994 | Ernst et al. ............... 219/121.67 |
| 5,532,451 A * | 7/1996 | La Rocca ................. 219/121.64 |
| 6,046,428 A | 4/2000 | Serruys |
| 6,183,064 B1 | 2/2001 | Murthy et al. |
| 6,255,620 B1 * | 7/2001 | Gershenson et al. .... 219/121.67 |
| 6,508,153 B1 * | 1/2003 | Lumberg et al. ................ 83/318 |
| 6,515,256 B1 | 2/2003 | Battaglia |
| 7,045,740 B2 * | 5/2006 | Leibinger et al. ........ 219/121.82 |
| 2006/0118529 A1 | 6/2006 | Aoki et al. |
| 2008/0029489 A1 * | 2/2008 | Ohnishi et al. .................. 219/68 |

FOREIGN PATENT DOCUMENTS

| | | |
|---|---|---|
| DE | 41 28 194 A1 | 3/1993 |
| EP | 1 586 407 A1 | 10/2005 |
| JP | 05-318156 | 12/1993 |
| JP | 08-332565 A | 12/1996 |
| JP | 2000-61752 | 2/2000 |
| WO | WO 2004/065055 A1 | 5/2004 |

\* cited by examiner

METHOD FOR LASER CUTTING OF UNFINISHED METAL SHEETS AND LASER CUTTING MACHINE FOR CARRYING OUT THE METHOD

CROSS REFERENCE TO RELATED APPLICATIONS

Applicant claims priority under 35 U.S.C. §119 of European Application No. 05405035.6 filed Jan. 25, 2005. Applicant also claims priority under 35 U.S.C. §365 of PCT/CH2005/000778 filed Dec. 30, 2005. The international application under PCT article 21(2) was not published in English.

The invention relates to a method for laser cutting of unfinished metal sheets according to claim 1, as well as to a laser cutting machine according to claim 7, for carrying out the method.

The invention particularly relates to a method for laser cutting of unfinished metal sheets using a laser cutting machine that has a laser cutting head that can be moved in a horizontal plane, and in which the unfinished metal sheets are pushed into a cutting region of the laser cutting machine in an advance direction V, piece by piece, for processing. In this connection, piece by piece processing is understood to mean a process in which a large, rectangular metal plate, here also called an unfinished metal sheet, is pushed further and further into the cutting region of a laser cutting machine, piece by piece, in order to there be processed in a number of processing steps.

It is true that nowadays, there are laser cutting machines in the industrial sector with which large unfinished metal sheets of the type stated can be processed in a single pass. However, these machines also require a large amount of space for this reason, because not only the actual processing region but also the loading and unloading region take up a lot of space. Furthermore, all of the parts generally have to be designed for relatively large loads. Machines of this size that work precisely are therefore generally very expensive and, as mentioned, require an enormous amount of space.

There is therefore also a need to be able to offer smaller and, in particular, also more space-saving laser cutting machines for processing of metallic plate material (sheet metal or metal plates).

Solutions are known from the sector of laser processing of thinner sheet-metal materials, in which the starting material is present in roll form. Such a solution is known, for example, from U.S. Pat. No. 6,515,256. In this connection, a metal strip is guided into a laser processing machine and a plurality of parts is produced from the metal strip, by means of laser processing. Finally, the parts that have been produced are removed from the residual strip. A similar solution is also shown by U.S. Pat. No. 6,183,064. Here, the roll material is a composite strip and the parts that are produced are "individualized" by means of a laser. It is true that in the case of these solutions, the starting material is also pushed farther and farther into the cutting region of a laser cutting machine, piece by piece, but the methods only appear to be suitable for roll material, but not for metal plates, which have little or no flexibility.

Another solution of this category is also shown by U.S. Pat. No. 4,782,208. It shows a method and a device for cutting up strips. Here again, the starting material is present in roll form, as a metal strip. The partial strips cut out of the metal strip by means of laser cutting are also rolled up again. It is true that the cutting lines for cutting out the partial strips run essentially parallel to the advance direction, but the individual partial strips that are cut out have overlaps in a direction crosswise to the advance direction. This serves the purpose of utilizing the starting material as well as possible and cutting out the greatest possible number of similar parts.

In the sector of laser cutting of starting material not in roll form, JP-05-318156 (by Amada) discloses a method for processing metal plates as well as a laser/punch composite machine. With regard to the sequence of processing steps, it can be derived from this disclosure that parts cut by means of laser cutting are separated from the metal plate, after laser processing, by means of a punch tool.

JP-2000-061752 (by Amada) also shows a method for processing plates, as well as a plate processing machine. With regard to the processing sequence, what obviously happens here is that first, part of the starting plate material is fetched, whereby it is at first separated from the rest of the starting plate material, with great precision.

Finally, additional publications on the Internet show that there are manufacturers of laser cutting systems who offer equipment whose space requirement, i.e. set-up area, is adapted to special requirements.

Thus, for example, the Trumpf company (see www.trumpf.com) shows a 2D laser cutting systems having the designation TRUMATIC L 2510 for automated laser cutting, which requires only a small set-up area. The TRUMATIC L 2510 utilizes a linear pass-through concept, in that a loading device, a processing station, and an unloading device are disposed in linear manner. In the case of this machine, the unloading device is moved into the working plane of the machine after the parts have been processed and removes the finished parts plus the residual lattice from the working region, using an unloading rake. At the same time, the machine can be loaded with the next unfinished metal sheet from the loading region.

A similar processing concept, although it is implemented in somewhat different manner, is shown by a laser processing center from the Axel company (www.lvdgroup.com). Here again, only a minimal set-up area is supposedly required, thanks to the compact design. In contrast to the machine from Trumpf described above, here loading of the machine takes place forwards, from a loading direction, while unloading of the machine takes place backwards, but in the same direction.

However, neither of these two machines and also none of the publications mentioned above with regard to methods for laser processing of metal plates show a processing method for large, oblong unfinished metal sheets, in which the unfinished metal sheet is pushed farther and farther into a defined position in a cutting region of the laser cutting machine, piece by piece. Fundamentally, however, a pass-through method of processing opens up the possibility, even in the case of processing of metal plates, of using smaller laser processing machines, because the size of the cutting, i.e. processing bed no longer has to correspond to the full size of the starting material.

It is the task of the present invention to indicate a method for laser cutting of unfinished metal sheets as well as a laser cutting machine for carrying out the method, in which an unfinished metal sheet is pushed farther and farther into a defined position in a cutting region of the laser cutting machine, piece by piece, for processing, and in which the individual method steps can be carried out with great flexibility, in order to achieve optimal utilization of the unfinished metal sheet.

This task is accomplished by means of the characteristics of claims 1 and 6.

The solution for this task proceeds from the assumption that an unfinished metal sheet is processed in a processable region that corresponds to the cutting region of the laser cutting region in terms of its expanse, in the entire processable region or only in a part of it, by means of laser cutting, that a plurality of such work steps, strung together, are possible, and that in the case of each new or repeating processing step, the results of the preceding processing step are also taken into consideration, or can also be taken into consideration.

If one proceeds from these premises, it then becomes possible to optimally structure the material utilization of the unfinished metal sheet, despite the pass-through processing method. In most cases, in this connection, optimization is desired particularly with regard to a maximal utilization of area (maximal number of parts that can be produced from the unfinished metal sheet). Optimizations of this type, however, are generally only possible if overlaps in all directions are permissible in the disposition of the individual parts. However, precisely this is significantly improved in many cases by means of the possibility of processing an unfinished metal sheet only in one region, per working step, which corresponds to only part of the cutting region of the laser cutting machine, in terms of its expanse (for example in the case of approximately L-shaped parts, the main expanses of which approximately reach the size of the cutting region of the laser cutting machine). In the case of the method according to the invention, overlaps can easily extend even in any desired direction, in other words both lengthwise and crosswise to the advance direction of the unfinished metal sheet.

In order to be able to achieve problem-free separation (after processing) between a part of an unfinished metal sheet that has already been processed and a part of the unfinished metal sheet that has not yet been processed, the cutting table on which the finished parts and the remaining lattice lie is disposed to be adjustable in height. Preferably, this height adjustment takes place in such a manner that aside from an actual working height (cutting table in a processing position), a first plane that lies below the working height (for transfer of the finished parts and the residual lattice to an unloading fork) and a second plane that lies even farther below the working height are present. The aforementioned separation then takes place by means of lowering the cutting table to the first plane; the actual transfer of the finished parts and of the residual lattice to an unloading fork takes place by means of further lowering of the cutting table to the second plane.

Finally, the result is achieved, by means of the fundamental disposition of the material flow (removal direction preferably perpendicular to the advance direction), that the removal region is disposed directly next to the cutting region and therefore also very well accessible and allowing a clear overview for the machine operator. Furthermore, as is evident from the drawings of the exemplary embodiment, in this way the laser cutting machine can be built in very compact and space-saving manner.

In the following, the method according to the invention will be explained in greater detail using fundamental diagrams.

The drawings show:

FIG. 1 A top view of an unfinished metal sheet after its placement in the cutting region of a laser cutting machine, FIG. 2a A fundamental diagram of a processing step in which an unfinished metal sheet is processed in the entire processable part, FIG. 2b A fundamental diagram of a processing step in which an unfinished metal sheet is processed only in part of the processable region, FIG. 3 A top view of finished parts and a residual lattice after a processing step according to FIG. 2b, FIG. 4 A top view of an unfinished metal sheet after a first processing step according to FIG. 2b and after its renewed placement in the cutting region of the laser cutting machine for another processing step, FIG. 5 Three views of a laser cutting machine according to the invention, FIG. 6 A schematic representation of the removal process of the finished parts and of the residual lattice from the laser cutting machine, according to the invention.

Figures 1, 2A, 2B:
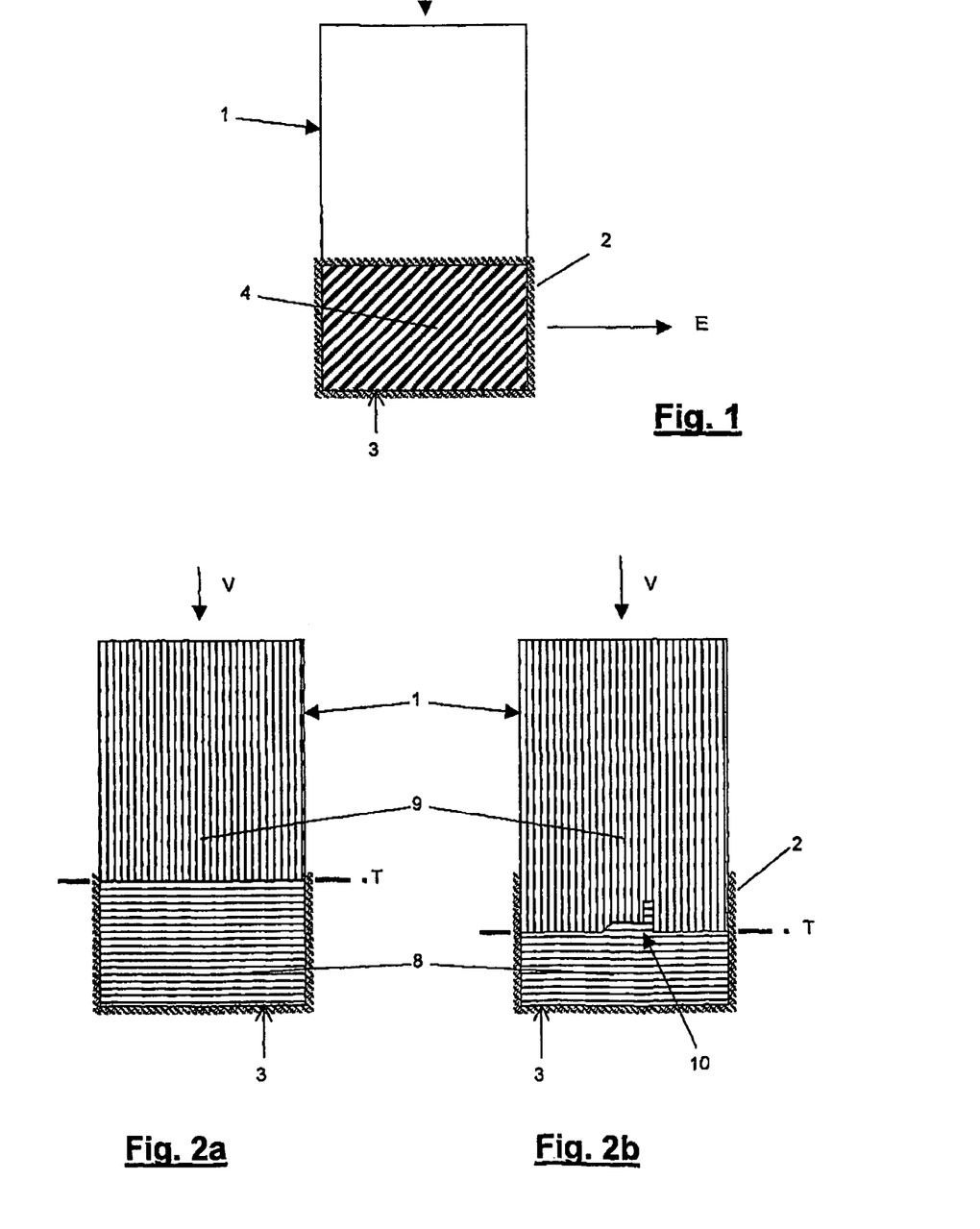

FIG. 1 shows a top view of an unfinished metal sheet 1 after its placement in a cutting region 2 of a laser cutting machine. This placement is, of course, always a defined position in the working space of the laser cutting machine, shown in simplified manner in this figure, in that a front edge 3 of the unfinished metal sheet 1 is oriented relative to the front edge of the cutting region 2, for example. A processable region 4 of the unfinished metal sheet corresponds, in terms of its expanse, to the cutting region 2 of the laser cutting machine. For placement in the cutting region 2, the unfinished metal sheet 1 is pushed into the cutting region 2 of the laser cutting machine in an advance direction V. The unfinished metal sheet 1 then lies on a cutting table 5, in the cutting region 2 of the laser cutting machine, which table is configured as a hoist table (see also FIG. 6 in this regard). After laser processing has taken place, the finished parts 6 as well as the residual lattice 7 (see also FIG. 3 in this regard) are removed from the working space of the laser cutting machine in a horizontal removal direction E, which is advantageously disposed at a right angle to the advance direction V.

The unfinished metal sheet 1 can now be processed in a processing step, either in the entire processable region 4 or only in a part of it. To make this clear, the processed part 8 of the unfinished metal sheet, in each instance, is provided with horizontal cross-hatching, and the non-processed part 9 of the unfinished metal sheet, in each instance, is provided with vertical cross-hatching.

FIG. 2a shows a fundamental diagram of a processing step in which an unfinished metal sheet 1 is processed in the entire processable part 4.

FIG. 2b shows a fundamental diagram of a processing step in which an unfinished metal sheet is processed only in part of the processable region 4. In this case, one or more overlap regions 10 can also exist between the processed part 8 of the unfinished metal sheet 1 and the non-processed part 9 of the unfinished metal sheet 1. In this schematic representation, the overlap region 10 extends in a direction parallel to the advance direction V, but overlaps crosswise to the advance direction V can also be present.

In both cases, a number of parts is cut out per processing step, in the processed part 8 of the unfinished metal sheet 1, by means of laser cutting. The shape and the (optimized) arrangement of the part contours determine whether an overlap regions 10 is necessary or practical. Usually, such optimizations are carried out, in any case, by means of software that is known and available to a person skilled in the art. In both cases, however, in the final step, the processed part 8 of the unfinished metal sheet 1 is separated from the non-processed part 9 of the unfinished metal sheet 1 along a parting line T. In this connection, it can be part of the optimization process that is applied at what point in time of the laser processing parts of the parting line T or parts of the contours of the parts to be produced are cut. In the case of production processes according to FIG. 2b, in particular, it is easily possible that parts of the parting line T coincide with parts of the contours of the parts to be produced, in the overlap region 10, and therefore are cut first.

Figure 3:
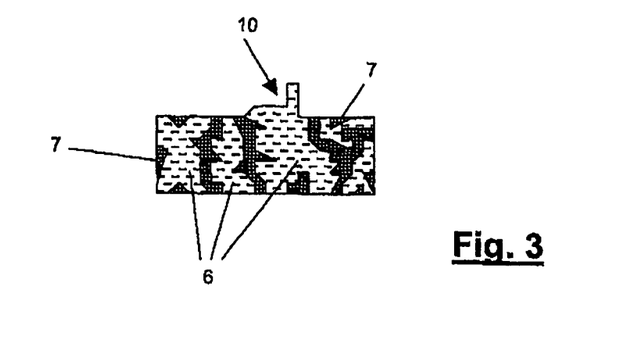

FIG. 3 shows a top view of finished parts 6 and the residual lattice 7 after a first processing step according to FIG. 2b. The example is purely schematic and can, of course, assume much more complex forms in reality. In any case, however, the finished parts 6 are always removed from the cutting region 2 of the laser cutting machine together with the residual lattice 7, after laser processing has taken place.

Figure 4:
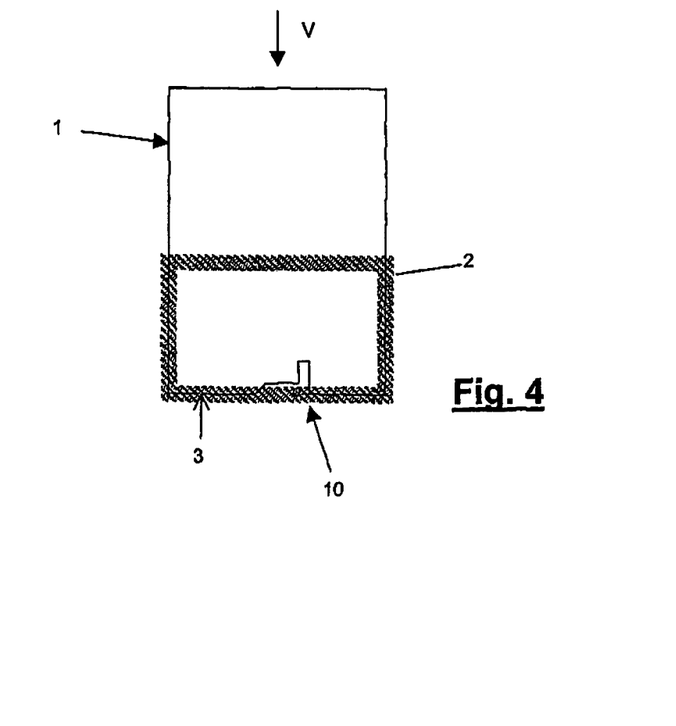

FIG. 4 shows a top view of a remaining unfinished metal sheet after a first processing step according to FIG. 2b and after renewed placement of the remaining unfinished metal sheet 1 in the cutting region 2 of the laser cutting machine for another processing step. Here again, first orientation to a defined position in the working space of the laser cutting machine takes place, after the unfinished metal sheet, i.e. the remaining unfinished metal sheet has been pushed farther in, again shown in simplified form by means of the front edge 3 of the unfinished metal sheet 1 again being oriented on the front edge of the cutting region 2. Of course, in the case of this processing step, the results of the previous processing step have to be taken into consideration, since the material is missing in the overlap regions and the parts contours have to be disposed taking this situation into consideration.

In total, however, the possibility of partial processing of the processable region 4 of an unfinished metal sheet 1 makes it possible for the individual method steps to be carried out with great flexibility and for optimal utilization of the unfinished metal sheet to be achieved even in the entire original expanse of same. Thus, the optimization process can be calculated on the basis of the predetermined parts to be produced, by means of an optimization software, even before the beginning of the first processing step, for the entire original expanse of the unfinished metal sheet, and the number of optimally required parting cut lines along parting lines T can be determined in advance.

A particular feature of the method according to the invention therefore also consists in the fact that the material utilization of the part of the unfinished metal sheet processed in each additional processing step takes place in such a manner that a parting line that runs at least partially at a right angle to the advance direction V is cut at the front edge of a remaining non-processed part of the unfinished metal sheet, which parting line preferably has no parts that project beyond it in the advance direction V. Therefore precise orientation of the front edge 3 of the unfinished metal sheet is made possible again for each processing process.

The flexibility of the method according to the invention is based essentially on the fact that overlap regions 10 are possible.

Figure 6:
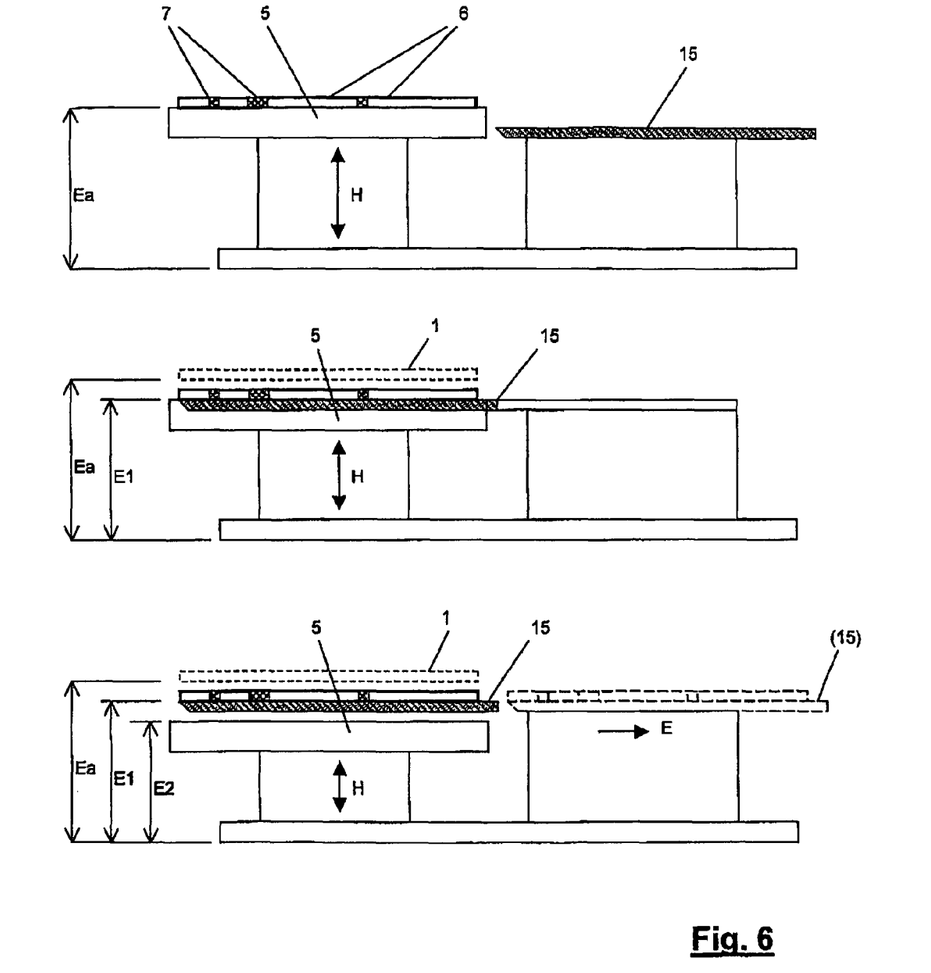

In order to be able to achieve problem-free separation (after processing) between a part 8 of the unfinished metal sheet 1 that has already been processed and a part 9 of the unfinished metal sheet 1 that has not yet been processed, in the case of such overlap regions 10, the cutting table 5 on which the finished parts 6 and the residual lattice 7 lie is disposed to be adjustable in height (for a description of the removal of the finished parts 6 and the residual lattice, see FIG. 6 and its description).

Figure 5:
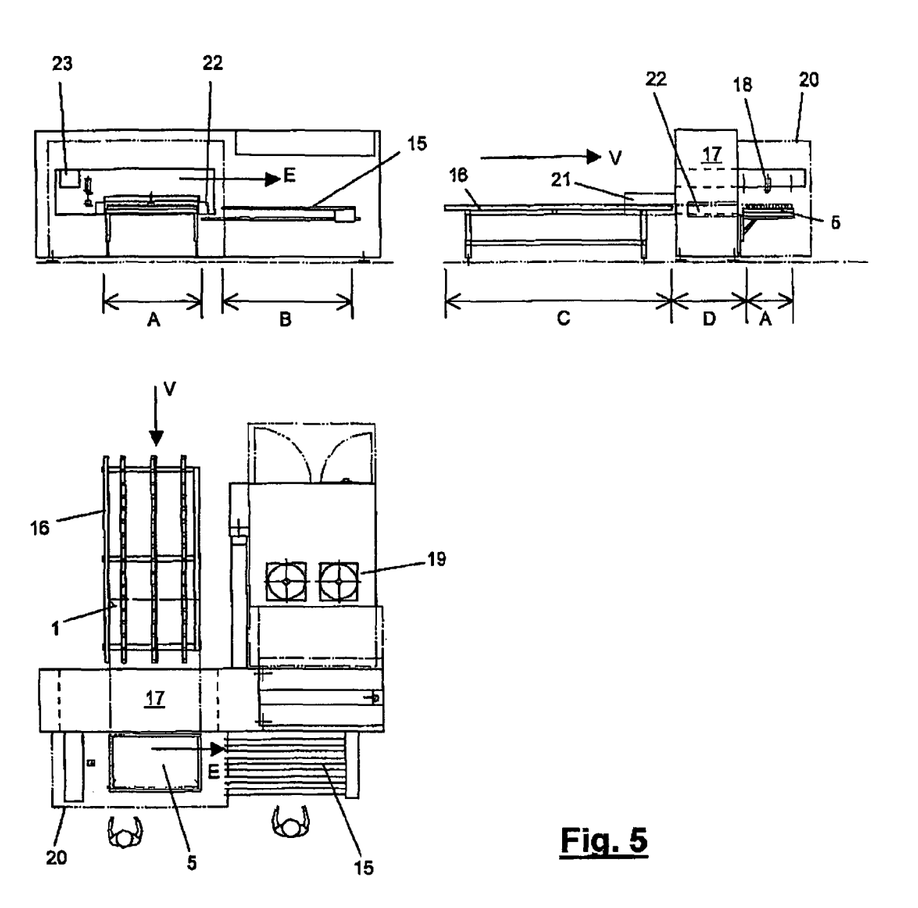

FIG. 5 shows three views of a possible configuration of a laser cutting machine according to the invention. A view from the top shows the arrangement of the cutting table 5, which is configured as a hoist table, as well as of an unloading fork 15 of a removal device. Charging with unfinished metal sheets 1 takes place by way of a support table 16, in the advance direction V. Next to and above the cutting table 5, there is a control device 17 having a laser cutting head 18. In this connection, the laser cutting head 18 moves on a guidance carriage, in a horizontal plane, above the cutting table 5. Next to the support table, there is a combination device 19 for suction and cooling. Protective devices 20 and 21 that are present are merely indicated. The two side views additionally show the arrangement of a sheet-metal advancing and clamping device 22, as well as of a guidance unit 23.

Thus, for a better understanding, a differentiation can also be made into a cutting region A, a parking position for a fork system B, a charging region C, and a parking position for the (unfinished metal sheet) table advance D.

Finally, FIG. 6 shows a schematic representation of the removal process of the finished parts 6 and of the residual lattice 7 from the laser cutting machine, according to the invention.

At first, i.e. during and immediately after processing of an unfinished metal sheet 1 in a first processing step, the cutting table 5 is in a working height Ea. The finished parts 6 and the residual lattice 7 are still lying on the cutting table 5, but they have already been separated from the remaining part of the unfinished metal sheet 1 by means of the parting cut along a parting line T that was mentioned earlier.

Then the cutting table 5, with the finished parts 6 as well as the residual lattice 7 still lying on it, is lowered to the height of a first plane E1. This brings about separation of the finished parts 6 and of the residual lattice 7 from the remaining part of the unfinished metal sheet 1 in the case of overlaps in the overlap region 10. Now the unloading fork 15 is moved into the cutting table 5 and under the finished parts 6 and the residual lattice 7. Of course, the cutting table 5 and the unloading fork 15 have to be configured accordingly, i.e. the parts that engage into one another must be configured sufficiently "closely spaced" so that even the smallest finished parts 6 still lie securely on them. However, a person skilled in the art knows such designs, which are available.

Then, the cutting table 5 is lowered to the height of the second plane E2. This brings about that the finished parts 6 and the residual lattice 7 now no longer lie on the cutting table 5 but rather on the unloading fork 15. The unloading fork 15, with the finished parts 6 and the residual lattice 7, can now be moved out in the removal direction E.

If there are no overlap regions 10, in other words for situations according to FIG. 2a, for example, lowering of the cutting table is not necessary merely for the purpose of separating the processed part 8 of the unfinished metal sheet from the non-processed part 9 of the unfinished metal sheet. In such cases, such an intermediate step can therefore be left out.

Of course, after the unfinished metal sheet 1 has again been drawn in by means of the sheet-metal advancing device 22 for another processing step, the cutting table 5 must be raised to the working height Ea again, so that the processable region 4 of the unfinished metal sheet 1 lies on the cutting table 5 and therefore even parts that have already been processed only partially are correctly supported.

REFERENCE NUMBER LIST

| | |
|---|---|
| 1 | unfinished metal sheet |
| 2 | cutting region of the laser cutting machine |
| 3 | front edge of the unfinished metal sheet |
| 4 | processable region of the unfinished metal sheet |
| 5 | cutting table |
| 6 | finished parts |
| 7 | residual lattice |
| 8 | processed part of the unfinished metal sheet |
| 9 | non-processed part of the unfinished metal sheet |
| 10 | overlap region |

-continued

| | |
|---|---|
| 11-14 | (not used) |
| 15 | unloading fork |
| 16 | support table (in the charging region) |
| 17 | control device |
| 18 | laser cutting head |
| 19 | combination device |
| 20 | protective device |
| 21 | protective device |
| 22 | sheet metal advancing and clamping device |
| 23 | guidance unit |
| V | advance direction |
| E | removal direction |
| H | height |
| T | parting line |
| Ea | working height |
| E1 | first plane |
| E2 | second plane |
| A | cutting region |
| B | parking position, fork system |
| C | charging region |
| D | parking position, table advance |

The invention claimed is:

1. A method for laser cutting of an unfinished metal sheet using a laser cutting machine, wherein the laser cutting machine has a laser cutting head that can be moved in a horizontal plane, and wherein the unfinished metal sheet is pushed into a cutting region of the laser cutting machine in an advance direction, piece by piece, for processing, wherein in a first step the unfinished metal sheet is processed in an entire region or only in a part of the region, by means of laser cutting, finished parts and a residual lattice produced by means of laser cutting are also separated from the unfinished metal sheet by means of laser cutting, the parts produced by means of laser cutting, together with the residual lattice, are subsequently removed from the cutting region of the laser cutting machine by means of an automatic removal device, and wherein the method can be repeated in the same manner in one or more processing steps, after removal of the finished parts with the residual lattice from the cutting region of the laser cutting machine, until the unfinished metal sheet has been completely used up, wherein the results of the preceding processing step are also taken into consideration in the case of each repeating processing step, wherein the material utilization of the part of the unfinished metal sheet that is processed in the at least one repeated processing step takes place in such a manner that a parting line that runs at least partially at a right angle to the advance direction is cut at the front edge of a remaining non-processed part of the unfinished metal sheet, which parting line has no parts that project beyond it in the advance direction, and an overlap region exists between the processed part of the unfinished metal sheet and the non-processed part of the unfinished metal sheet, wherein the overlap region can extend in a direction parallel and/or crosswise to the advance direction.

2. The method according to claim 1, wherein the method is repeated in at least one repeated processing step; and wherein the unfinished metal sheet and the part of the unfinished metal sheet that is processed are processed in such a manner that material utilization of the unfinished metal sheet is optimal.

3. The method according to claim 1, wherein after the production of parts via laser cutting and after separation of the processed part of the unfinished metal sheet from the non-processed part of the unfinished metal sheet a cutting table on which the finished parts and the residual lattice lie is lowered, in order to separate the processed part of the unfinished metal sheet from the non-processed part of the unfinished metal sheet, a removal fork is moved into the cutting table and under the finished parts and the residual lattice that are lying on the cutting table, the cutting table, on which the finished parts and the residual lattice are lying is lowered, thereby causing the finished parts and the residual lattice to come to rest on the removal fork, and the removal fork together with the finished parts and the residual lattice now lying on the removal fork are moved out of the cutting region of the laser cutting machine by means of the automatic removal device, in a removal direction.

4. The method according to claim 1, wherein the removal of the finished parts and of the residual lattice takes place in a horizontal removal direction that is disposed at a right angle to the advance direction.

5. A laser cutting machine comprising:

a cutting table movable in height;

a laser cutting head movable in any direction in a horizontal plane above the cutting table, in a cutting region;

a sheet metal advancing device for advancing an unfinished metal sheet in an advance direction, from a support table into a cutting region of the laser cutting machine, as well as for positioning the unfinished metal sheet in the cutting region of the laser cutting machine;

an automatic removal device comprising an unloading fork movable into and out of the cutting table; and a control device for controlling laser processing processes of the laser cutting machine, as well as for controlling loading and removal processes as a function of the laser processing processes;

wherein the cutting table can be moved from a working height into a first plane lying underneath the working height; and wherein the unloading fork can at the working height or at a height of the first plane move into and out of the cutting table to receive parts from the cutting table if the cutting table is lowered beneath the unloading fork.

6. The laser cutting machine according to claim 5, wherein the control device automatically performs a selection as to whether a transfer is carried out at the working height or at the height of the first plane as a function of a presence of an overlap region between a processed and a non-processed part of an unfinished metal sheet processed by the laser cutting machine.

7. The laser cutting machine according to claim 5, wherein the unloading fork can be moved in and out of the cutting table in a removal direction disposed at a right angle to the advance direction.

* * * * *

UNITED STATES PATENT AND TRADEMARK OFFICE
CERTIFICATE OF CORRECTION

PATENT NO. : 8,490,268 B2  
APPLICATION NO. : 11/795986  
DATED : July 23, 2013  
INVENTOR(S) : Thomas Plüss Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1471 days.

Signed and Sealed this

Eighth Day of September, 2015

Michelle K. Lee
*Director of the United States Patent and Trademark Office*